United States Patent Office 3,442,868
Patented May 6, 1969

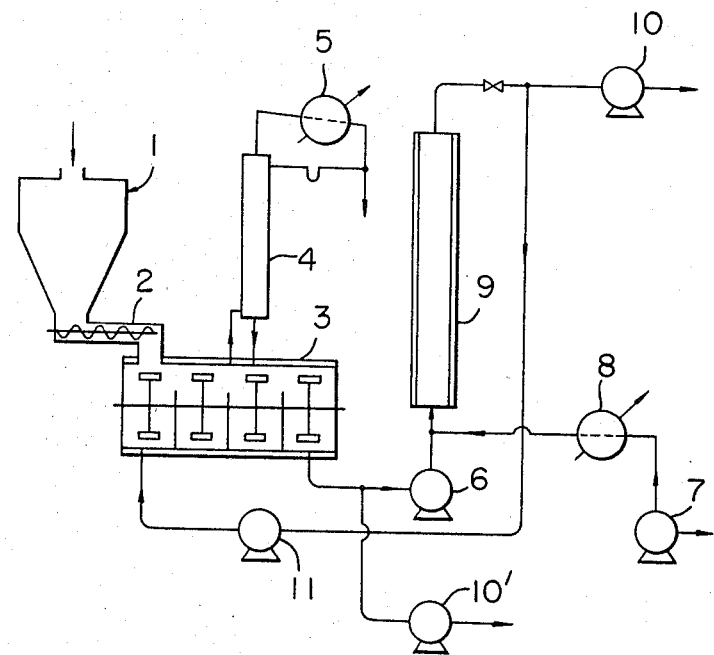

3,442,868
NOVEL PROCESS FOR THE PREPARATION
OF POLYESTER
Kazuo Ogata, Kiyoshi Kazama, Shozo Suzuki, and Yasuo
Morimatsu, Matsuyama-shi, Japan, assignors to Teijin
Limited, Osaka, Japan, a corporation of Japan
Filed July 15, 1966, Ser. No. 565,571
Claims priority, application Japan, July 20, 1965,
40/43,828
Int. Cl. C08g 17/01
U.S. Cl. 260—75                                    4 Claims

ABSTRACT OF THE DISCLOSURE

A process for producing fiber forming polyesters, e.g., polyethylene terephthalate without direct contact of the acid and glycol components comprising
(1) as the first step
reacting terephthalic acid or a mixture of dibasic acids containing at least 85% of the same with an oligomer (A) comprising the reaction product of such terephthalic acid or mixed acid component and a glycol, oligomer (A) having a degree of polymerization of one or more but less than 3 and having termini hydroxyl groups, to form an oligomer (B) having a higher degree of polymerization, i.e., 3 to 10 and hydroxyl groups substantially at the termini;
(2) as a second step,
reacting at least a portion of oligomer (B) with the glycol to depolymerize (B) to form oligomer (A′) having a degree of polymerization of one or more but less than 3; and
(3) as a third step,
forming the fiber forming polyester by polycondensing a material comprising any remaining portion of oligomer (B), a portion of oligomer (A′) or mixtures thereof while recycling the remaining portion of oligomer (A′) for use as oligomer (A) in the first step.

---

This invention relates to a novel process for the preparation of polyester from aromatic dibasic acid and glycol. The invention particularly relates to an improved process for the preparation of polyethylene terephthalate from terephthalic acid and ethylene glycol.

It is well known that highly polymerized polyester can be prepared from aromatic dibasic acid and glycol, inter alia, excellent polyester having fiber- and film-forming ability can be prepared from terephthalic acid and ethylene glycol. And, such polyester is prepared by a two-stage process, viz., the first stage of preparing monomeric bis-glycol ester of aromatic dibasic acid or its oligomer from the aromatic dibasic acid or its lower aliphatic ester and glycol, and the second stage of subjecting the product to further polycondensation. Whereas, it is self-evident that, in the above process, direct reaction of aromatic dibasic acid with glycol without the intervening conversion of the acid to its lower aliphatic ester is the more economical. However in case of directly reacting a difficultly soluble aromatic dibasic acid such as terephthalic acid with glycol without first converting it to its lower aliphatic ester, normally a great excess of glycol must be used and the esterification reaction is extremely time-consuming. During the reaction, furthermore, impurities such as diethylene glycol are by-produced due to the interreaction of glycol and introduced into the main chain of the polyester to degrade the quality of the product, as known among the experts.

For example, when a glycol condensate such as diethylene glycol is introduced into main chain of polyester, the resultant polyester has its softening point lowered, and its properties such as heat resistance, light resistance and oxidation resistance are all degraded. The degradation of such properties becomes still more distinct when the polyester is shaped into, for example, fiber or film. Particularly for the production of such articles as industrial fiber, film and the like which are frequently exposed to severe conditions, aforesaid degradation in the polyester properties prove to be fatal. Therefore it is a matter of extreme importance to devise a way of directly producing from terephthalic acid and glycol such polyester having minimum possible content of glycol condensate such as diethylene glycol, with a reaction rate industrially acceptable.

As an improvement in the production process of such high quality polyester by means of the direct method, it has been proposed to use as the reaction medium bis-ω-hydroxy alkyl terephthalate (hereinafter abbreviated as BHET) which is a reaction product, with the view to accelerate the reaction rate of terephthalic acid wth glycol or to inhibit the side reaction (cf. British Patent No. 776,282, German Patent No. 1,024,713).

However such improvement process is still incapable of inhibiting the objectionable side reaction to a satisfactory degree because in which free glycol is likewise present in the reaction system. Accordingly, as a further improvement of the said process, a proposal was made to control the mol ratio of terephthalic acid component to glycol component in the reaction system to no greater than 1:2 (cf. French Patent No. 1,327,594 and French Patent No. 1,368,576).

In such processes, however, evidently the following three types of reactions concurrently take place in the reaction system, viz., (1) terephthalic acid + glycol $\xrightarrow{\text{(esterification)}}$ BHET or its oligomer (2) terephthalic acid + BHET or its oligomer $\xrightarrow{\text{(esterification)}}$ oligomer of higher degree of polymerization (3) oligomer of higher degree of polymerization + glycol $\xrightarrow{\text{(depolymerization)}}$ BHET or its oligomer.

In the above, the reaction (1) is the main course of the esterification, and the reaction (2) is also an esterification reaction in which the terminal hydroxyl groups of the oligomer are bonded with terephthalic acid. The reaction (3) is the glycolysis (depolymerization) of the oligomer having a greater degree of polymerization formed in the reaction (2). In contrast to the process of the said British Patent No. 776,282 in which the reaction (1) is the dominant reaction, that of the latter French patents is the preferable, in the point that in the later the hydroxyl group concentration per unit volume of the reaction system is still lessened, but the two are essentially the same in that glycol is always present in the esterification reaction system Therefore in neither of the two, occurrence of etherification which is a side reaction, can be avoided.

Accordingly, the present invention relates to a process for the preparation of high quality polyester from aromatic dibasic acid and glycol with high efficiency, in which the deficiencies inherent in the conventional processes are eliminated.

More particularly, the invention relates to a process for the preparation of fiber-forming polyester comprising the below-specified three steps, viz.

(1) As the first step, reacting terephthalic acid with an oligomer (A) of terephthalic acid and a glycol of an average degree of polymerization 1 or more but less than 3 having terminal hydroxyl groups [hereinafter to be referred to merely as oligomer (A)], at the ratio of more than 1 mol of the latter per mol of the former at the temperature range of 220–280° C., preferably 230–260° C., thereby preparing an oligomer (B) having an average degree of polymerization ranging 3–10 and hydroxyl groups substantially at the termini [hereinafter to be referred to merely as oligomer (B)];

(2) As the second step reacting the said oligomer (B) with the glycol at the temperature range of 200–250° C., preferably 220–230° C., to depolymerize the oligomer (B), thereby preparing an oligomer (A') of an average degree of polymerization 1 or more but less than 3; and (3) As the third step, heating and condensing a part of the said oligomer (B) and/or the oligomer (A') to form polyester, while recycling the all or the rest of the oligomer (A') to use the same as the oligomer (A) of the first step.

In this invention, it is permissible to use any dibasic acid mixture containing no less than 85 mol percent of terephthalic acid in the first step, in place of the aforesaid terephthalic acid. In such a case, the oligomer (A) to be reacted with the mixture should consist of the same acid component and glycol component as of the dibasic acid mixture and the glycol, at substantially the same ratio.

According to the novel preparation process of polyester of the present invention, characteristically the aforesaid reaction (1) terephthalic acid + glycol $\xrightarrow{\text{(esterification)}}$ BHET or its oligomer does not take place at any stage of the polyester formation, and furthermore the aforesaid reaction (3) oligomer of higher degree of polymerization + glycol $\xrightarrow{\text{(depolymerization)}}$ BHET or its oligomer is performed in the substantial absence of free dibasic acid.

Consequently, according to the present invention substantially the reaction below (2) terephthalic acid + BHET (or its oligomer having a degree of polymerization less than 3) $\xrightarrow{\text{(esterification)}}$ an oligomer of a higher degree of polymerization (degree of polymerization = 3 –10)

alone participates in the polyester formation an as esterification reaction.

Again in the British Patent No. 776,282 and German Patent No. 1,024,713, the above reaction (3) is performed in the presence of free acid (e.g. terephthalic acid). When the reaction (3) is so performed in the presence of free acid, dehydration reaction between the hydroxyl radicals of glycol is promoted to result in mixing of glycol condensate such as diethylene glycol in the reaction product, causing lowering of the quality of the polyester formed, as shown in a later appearing comparative example. Whereas, according to the present invention at no stage of the polyester-forming reaction the reaction (3) taking place in the presence of free acid, the possibility of such glycol condensate's being co-polycondensed is minimized.

Furthermore, in accordance with the invention the reaction (2) and reaction (3) being conducted separately, optimum temperature conditions for each can be set up independently of the other. Thus, for example, the reaction (3) can be conducted at relatively lower temperature condition than that of the reaction (2), such as 200–250° C., preferably 220–230° C. For this reason also it is made possible in this invention to minimize the formation of glycol condensate.

In the present invention thus the esterification step, viz., the first step, being performed in the substantial absence of free glycol, not only the rate of etherification can be reduced but also the temperature of the reaction system can be raised, comparing the case in which free glycol is concurrently present. This means an increase in solubility of terephthalic acid into the reaction system, and the consequential increase in carboxyl radical concentration per unit volume makes up for the low hydroxy radical concentration caused by the absence of free glycol, and this, together with the high temperature of the reaction system, contribute to maintain the high rate of esterification. On the other hand, for the depolymerization step, viz., the second step, no consideration needs be given to the esterification reaction, but it is possible to choose the optimum depolymerization conditions such as relatively low temperature, considering only of the etherification reaction. As the result, according to the process of the invention high quality polyester having an extremely low glycol condensate content is formed.

The amount of the terephthalic acid to be added to the oligomer (A) of terephthalic acid and glycol in the first step of the present invention should be such as will make the esterified product trimer to decamer, particularly trimer to heptamer. An amount less than the above lower limit is of little practical value from the stand point of productivity, and with the use of a greater amount than the upper limit not only a large quantity of unreacted carboxyl radical is found in the esterification reaction product, but also, due to the addition of a large quantity of terephthalic acid to the oligomer (A) at the initial stage of the reaction, viscosity of the slurry rises to lower the agitation efficiency and heat-conductivity, thereby preventing the smooth progress of the esterification reaction.

Further, the addition of terephthalic acid in this step may be effected at a single time or done at several times dividedly.

As the oligomer (A) of terephthalic acid and glycol employed in the esterification reaction according to the invention, mainly those of degree of polymerization 1 to less than 3 are intended, but the presence of a minor amount of tetramer or oligomer of higher order is permissible, since in the invention isolation of such an oligomer of one and certain degree of polymerization as the starting material is not practiced.

Upon addition of the above specified amount of terephthalic acid to such a oligomer (A) in the first step of the invention, the reaction starts from at about 220° C., and the boiling point gradually rises with the increase in the average degree of polymerization of the liquid phase reaction system. The esterification in accordance with the invention is not necessarily conducted always at the boiling point of the reaction system, but it better meets the purpose to raise the reaction temperature with the rise in the boiling point as the reaction progresses. The inside temperature, however, should preferably be controlled so that the highest temperature should not exceed 280° C. to prevent coloration of the product.

With the progress of the esterification reaction the un-dissolved terephthalic acid disappears, and when the liquid reaction phase becomes substantially transparent, the esterification step comes to the termination.

The depolymerization reaction which is the second step of the invention is performed with addition of glycol to the reaction system containing the above esterified product [oligomer (B)], a small amount at a time.

In that case, the total amount of the glycol to be added should preferably be no greater than that sufficient to convert the oligomer (B) to bisglycol ester, at the most.

Thus a bisglycol ester of terephthalic acid of a low side product content, and its lower oligomer having a degree of polymerization less than 3 are obtained. If an excess of glycol should be used in this stage, when the product is recycled to participate in the first step reaction, the boiling point of the reaction system is lowered to undesirably retard the rate of the esterification reaction and also the etherification reaction takes place. Consequently the object high quality polyester of the invention cannot be obtained. For this reason the use of glycol within the above-specified quantity range is perferred.

In the second step of the invention, with the view to accelerate the rate of depolymerization with glycol, known and suitable ester-interchange catalyst or polycondensation catalyst may be present with advantage. Also the reaction may be optionally performed at an elevated pressure.

In the recirculation step, viz., the third step of the invention, the esterification reaction product [oligomer (B)] of the first step and/or the depolymerization product [oligomer (A)] of the second step are withdrawn as the starting material for the subsequent polycondensation step.

The polycondensation step is performed in the manner known per se, in the presence of known catalyst and suitable additives.

The process of the present invention is practicable either batchwise or continuously, but is particularly adapted for continuous method.

Thus in accordance with the invention, the oligomer (B) or the oligomer (A) are withdrawn from the reaction system in an amount corresponding to that of the terephthalic acid added in the first step and that of the glycol added in the second step, and subjected to polycondensation, while the remaining oligomer (A) is recycled to be used an the starting oligomer (A) of the first step, and accordingly it is made possible to continuously produce high quality polyethylene terephthalate of extremely low glycol condensate content, using merely terephthalic acid and glycol as the starting materials to be freshly supplied.

Furthermore, with the practice as above in accordance with the subject invention, high quality polyethylene terephthalate of the level hardly attainable by conventional direct method can be obtained at high efficiency and continuously.

Again the terephthalic acid may be replaced by a mixture of terephthalic acid with other dibasic acid or acids, of which terephthalic acid content is at least 85 mol percent, as aforesaid. In that case, modified polyester is likewise obtained. As the dibasic acids useful for the invention other than terephthalic acid, the following may be named, for example: aromatic dibasic acids such as isophthalic, phthalic, homoterephthalic, 4,4' - diphenyldicarboxylic, naphthalenedicarboxylic and tetrachloroterephthalic acids as well as 1,2-bis(4-carboxyphenyl) ethane and 1,2-bis(p-carboxyphenoxy) ethane; alicyclic dibasic acids such as hexahydroterephthalic and 2,6 - decahydronapththalenedicarboxylic acids; and aliphatic dibasic acids such as succinic, glutaric, adipic, sebacic, and $\omega,\omega'$-diethyletherdicarboxylic acids, etc.

As the useful glycols, besides those represented by the formula

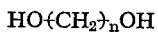

(in which $n$ is a positive integer of 2–10), aliphatic glycols having side chains such as isobutylene glycol, neopentylene glycol and the like; alicyclic glycols such as 1,4-cyclohexanediol, 1,4-cyclohexanedimethanol, 2,2,4,4-tetramethylcyclobutanediol and the like. 2,2-bis(4-hydroxyphenyl) propane, hydroquinone, 2,5- or 2,6-dihydroxynaphthalene, p-($\beta$-hydroxyethoxy) phenol and the like may also be named.

A polyfunctional compound may be added to an extent such that it may keep the polymer substantially linear and may not lead to the loss of its fiber- and film-forming ability. Addition of monofunctional compound neither interferes with the achievement of the invention. Inorganic compounds such as titanium oxide and carbon black may also be added for the purpose of delustering, coloring, and the like. Addition of known catalysts is not detrimental to the process of this invention.

Hereinafter an explanation will be made with reference to the attached drawing.

The drawing is for still detailed explanation of the subject process, showing one embodiment of esterification reaction in continuous manner. In figure, terephthalic acid stored in the tank 1 is continuously fed to the esterification tank 3 via the screw-type conveyor 2. The esterification tank 3 is of horizontal type, inside of which is divided into plural chambers with partitions. In every chamber, agitation is performed with the stirrer blade attached to one common rotation shaft. Also the chambers are heated by a common heating medium. With the progress of the reaction, each of the chambers is given a temperature higher than the one preceding, and the content of each of the chambers overflows into the next chamber in sequence. From the reaction product which becomes substantially transparent in the last chamber, the oligomer (B) in an amount corresponding to the terephthalic acid added per unit time is sent to the polycondensation apparaus (not shown) by an oligomer (B) measuring pump 10, and the remnant is fed into a pressurized depolymerization tower 9 provided with a heating jacket, through a measuring pump 6. Into the tower ethylene glycol is continuously fed through a measuring pump 7 and a preheater 8, to perform the depolymerization reaction therein. The reaction product [oligomer (A)] is recycled into the first chamber of the esterification tank 3, through a measuring pump 11. The steam formed in the esterification tank 3 is separated by means of a distillation column 4 and removed from the system through a condenser 5.

In another embodiment of the invention, the oligomer (B) formed by esterification reaction is entirely depolymerized without being discharged from the measuring pump 10. In this case the reaction product [oligomer (A)] in an amount corresponding to that of terephthalic acid fed per unit time is delivered through the measuring pump 10' to the polycondensing apparatus, and the remainder is returned to the first chamber of the esterifying tank 3.

Hereinafter the invention will be explained in further detail with reference to working examples, in which intrinsic viscosity is that measured in o-monochlorophenol at 35° C., and softening point is the softening temperature measured with penetrometer. Esterification ratio refers to the reaction ratio of the terephthalic acid supplied, and degrees of polymerization, to the apparent degree of polymerization obtained when all of the acid component and the glycol component reacted. Unless otherwise indicated, part is by weight. The measurement of diethylene glycol content is done in accordance with the process of R. Janssen, H. Ruysschaert & R. Vroom described in Makromol. Chem., vol. 77, p. 153 (1964), and the content is expressed in mol percent to the acid component.

Example 1

A one-liter flask heated with a mantle heater was equipped with a distillation column having a packed portion of 10 cm., a thermometer, a stirrer and a device for addition of ethylene glycol.

To the same, 102.2 g. of a melt of a low polymer containing terephthalic acid and glycol at the molar ratio of 1:1.2 (number average degree of polymerization=5, melting point=249° C., antimony trioxide content=0.025 mol percent to the terephthalic acid) was added. When the inside temperature reached 250° C., 18.6 g. of ethylene glycol was added to the system by the adding device, for over 3 minutes.

The inside temperature fell to 205° C. with the addition of glycol, and then gradually rose to 225° C. During that time, no distillation of ethylene glycol was observed. To the system then 41.5 g. of nitrogen-substituted terephthalic acid and 0.02 g. of antimony trioxide were added. Thereupon the inside temperature fell to 217° C., but as soon as it rose to 218° C., distillation of water started. The inside temperature gradually rose to 255° C. after 52 minutes, when the content became transparent. The distillation of water stopped at that point, and thereafter the inside temperature rapidly rose to 267° C. within the subsequent 10 minutes.

Thereupon 27.9 g. of ethylene glycol was added for over 7 minutes, during which the inside temperature fell to 220° C., which again rose to 227° C. after additional 10 minutes. The resultant reaction mixture was a white solid weighing 182 g. and having a melting point of 189° C. The same solid was polycondensed in a heated bath of 285° C. with stirring, for the initial 20 minutes under the pressure gradually decreasing from 760 mm. Hg to 1 mm. Hg, and for the subsequent 50 minutes, under the pressure of 0.3 mm. Hg. Then the reaction was suspended.

A water-white polyester having an intrinsic viscosity of 0.703, a softening point of 263.6° C., and a carboxy radical content of 11.0 millieq./kg. was obtained.

Example 2

To a molten esterified product (temperature=265° C.) obtained in the manner as described in Example 1, 27.9 g. of ethylene glycol containing 0.03 g. of antimony trioxide was added for over 7 minutes. During the addition the inside temperature fell to 220° C., and 13 minutes thereafter rose to 230° C. when 62.2 g. of terephthalic acid was added to the system. The inside temperature rose from 224° C., at gradually accelerated rate and reached 255° C. after 88 minutes, whereupon the reaction system becoming transparent. Throughout the operation the temperature at the top of the column was 102° C. and constant, and from the top water formed was continuously withdrawn. The reaction product was a transparent melt (total amount=231 g.) slightly tinged with yellow, having a melting point of 249.5° C. A part of the same was taken and polycondensed in a heated bath of 285° C. in the similar manner as in Example 1, to form a white polyester having an intrinsic viscosity of 0.722, a softening point of 263.2° C. and a carboxyl radical content of 10.5 millieq./kg.

Example 3

In a continuous plant constructed as shown in the flow sheet of figure, from the continuous powder supplying device 2, 36 kg. of terephthalic acid per hour, and from the recirculation pump 11, 111 kg. of a low polymer having a degree of polymerization of 1.25 per hour, were supplied continuously into the first chamber of the esterification tank 3. The inside of the tank 3 was maintained at the temperature level averaging 235° C. by means of a heating jacket. The terephthalic acid and the oligomer (A) moved from the first chamber ultimately to the fourth chamber in sequence by means of overflow, while homogeneously stirred. The steam formed by the reaction was separated from the vapor of ethylene glycol by the rectification column 4, and removed from the system through the condenser 5. After the average staying time of about 4 hours, the oligomer (B) having a degree of polymerization of 4.6 was taken out with the pump 6, which was transparent and had an esterification ratio of 96%. Ethylene glycol containing as dissolved therein 0.025 mol percent to the terephthalic acid supplied of antimony trioxide was sent from the pump 7 to the preheater 8 to be preheated to 225° C., and then was mixed with the above intermediate polymer. The mixture was fed into the depolymerization tower 9, inside of which was maintained at a pressure of 3 kg./cm.² and at a temperature of average 225° C. by means of a jacket. After about 40 minutes' reaction, the product withdrawn had a melting point of no higher than 160° C., and thus was converted to an oligmer (A) having a degree of polymerization of 1.25 and an esterification ratio of 97%, due to the thorough depolymerization. Among the low polymer, 111 kg./hour was recycled to the esterification tank 3, and the rest was taken out the pump 10 at a rate of 53 kg./hour, which was sent to continuous polymerization step after addition thereto of the necessary catalyst, stabilizer and delusterant. Thus a polymer having an intrinsic viscosity of 0.65 was continuously produced, which had a softening point of 261.5° C., a diethylene glycol content of 1.5 mol percent and a very satisfactory color tone.

Example 4

Using the same apparatus as in Example 3, experiments were run with varied reaction conditions, with the results as shown in Table 1.

TABLE 1

| Example Number | 1 | 2 | 3 | 4 |
|---|---|---|---|---|
| THE FIRST STEP | | | | |
| Amount of terephthalic acid (kg./hr.) | 36 | 36 | 36 | 36 |
| Amount of oligomer (A) (kg./hr.) | 167 | 83 | 132 | 112 |
| Average reaction temperature (° C.) | 230 | 235 | 240 | 240 |
| Average staying time (hr.) | 2.9 | 5.0 | 3.7 | 4.4 |
| Degree of polymerization of reaction product [oligomer (B)] | 3 | 5 | 5 | 8 |
| Esterification degree of reaction product [oligomer (B)] (percent) | 96 | 97 | 95 | 94 |
| DEG content of the reaction product [oligomer (B)] (mol percent) | 1.95 | 1.78 | 1.70 | 1.50 |
| THE SECOND STEP | | | | |
| Amount of ethylene glycol (kg./hr.) | 24.2 | 27 | 19 | 19 |
| Type of depolymerization catalyst | Mn-acetate | | Sb₂O₃ | |
| Amount of depolymerization catalyst (mol percent) | 0.015 | 0.015 | 0.015 | 0.015 |
| Average reaction temperature (° C.) | 225 | 230 | 230 | 230 |
| Average staying time (hr.) | 0.5 | 0.9 | 0.7 | 0.8 |
| Degree of polymerization of reaction product [oligomer (A)] | 1.25 | 1.0 | 1.7 | 1.7 |
| Esterification degree of reaction product [oligomer (A)] (percent) | 97 | 98 | 96 | 95 |
| DEG content of reaction product (oligomer (A)] (mol percent) | 2.16 | 2.18 | 1.94 | 1.78 |

Example 5

Using the same apparatus as used in Example 3, the operation was run under the same reaction conditions employed in Example 3 except that in place of the terephthalic acid, terephthalic acid containing 10 mol percent of isophthalic acid was used. The oligomer (B) taken out by the pump 6 was a transparent liquid having a degree of polymerization of 4.6 and an esterification ratio of 97%. The reaction product [oligomer (A)] at the exit of the depolymerization tower, i.e., the low polymer, had a degree of polymerization of 1.25 and an esterification ratio of 98%. The same was sent to the continuous polymerization step to produce a polymer of excellent color tone, having an intrinsic viscosity of 0.65, a softening point of 236° C., and a diethylene glycol content of 1.5 mol percent.

Example 6

In a polymerization autoclave, 151 g. of the oligomer (A) having an average degree of polymerization of 1.25 obtained in Example 3 was heated to 200° C. and melted. To the melt 41.5 g. of terephthalic acid was added, and the system was made into a homogeneous solution under a temperature level maintained at 240° C. The inside temperature of the autoclave was raised to 270° C. and, after removal of the ethylene glycol subsequently distilled, further raised to 285° C. while the pressure was gradually reduced to 0.1 mm. Hg for over 30 minutes. Sixty minutes thereafter, a polymer of excellent color tone having an intrinsic viscosity of 0.65 and a softening point of 262.3° C. was obtained.

Example 7

This example is to show the difference between below specified reactions (A) and (B) for synthesizing the same amount of bis(β-hydroxyethyl) terephthalate (BHET), as illustrated by the amount of diethylene glycol (DEG) byproduced.

(A)    $TPA + 2EG \rightarrow BHET + 2H_2O$ (B)    $\frac{1}{2}\ Dimer + \frac{1}{2}EG \rightarrow BHET$ Reaction (A)

A 0.5 liter autoclave provided with a distillation column was charged with 166 parts of terephthalic acid (TPA)

and 124 parts of ethylene glycol (EG), and its inside air was replaced by nitrogen gas. Then the inside pressure was raised to 2.5 kg./cm.² (gauge). The autoclave was then immersed in a bath of 265° C. while subjected to an agitation of 60 r.p.m. The inside temperature rose substantially proportionally for 10 minutes, during which the pressure was controlled to 2.5 kg./cm.² (gauge) by means of a needle valve provided on the apparatus. When the inside temperature reached 220° C. after 30 minutes' heating, distillation off of water started, and the temperature reached to a substantially constant level at 230° C. Two hours after the starting of the distillation, the temperature at the top of the column started falling, and when it reached 90° C. after subsequent 30 minutes, the reaction was suspended. The reaction time totalled 180 minutes. The reaction product was a white solid containing 4.60 mol percent of diethylene glycol.

Reaction (B)

Bis(β-hydroxyethyl) terephthalate synthesized by ester-interchange reaction of 97 parts of dimethyl terephthalate, 62.0 parts of ethylene glycol and 0.015 mol percent of manganese acetate was placed in a flask provided with a short packed tower, and made into a melt of 240° C. Upon addition thereto of 27.6 g. of terephthalic acid, the inside temperature of the system fell to 220° C., and so the system was heated with a mantle heater with an agitation at the rate of 60 r.p.m. With the progress of the reaction the inside temperature gradually rose, and when it reached 242° C. the terephthalic acid disappeared. This product was of dimeric composition of bis(β-hydroxyethyl) terephthalate, and its diethylene glycol content was 1.07 mol percent. To the same dimer 0.03% of antimony trioxide and 20.7 parts of ethylene glycol were added, causing a temporary temperature fall of the system to 200° C. The inside temperature again gradually rose as the heating was continued, and when it reached 230° C., the depolymerization reaction terminated. The reaction time required was 40 minutes. Thus obtained reaction product had a composition of bis(β-hydroxyethyl) terephthalate, and of which diethylene glycol content was 1.17 mol percent. Accordingly, under the above reaction condtions, the increase in diethylene glycol content was no more than 0.1 mol percent.

Example 8

This example is to show the influence of the presence of carboxyl radical of terephthalic acid upon the reaction rate of etherification at the same temperature level and same hydroxyl radical concentration.

2.50 grams of pure bis(β-hydroxyethyl) terephthalate (melting range=108.5–109.0° C.) was sealed in a glass tube of 8 mm. inner diameter of which inside air was substituted with nitrogne. Five of such sealed tubes were prepared and which are made the group A. Separately, five sealed tubes were prepared in which 1.66 g. of terephthalic acid and 1.24 g. of ethylene glycol were similarly sealed. These were made the group B tubes. The tubes of the both groups were immersed in a constant temperature oil bath of 240° C. and after 150 minutes the terephthalic acid in the tubes B dissolved to make a homogeneous solution. There after each one of the group A tubes and group B tubes were withdrawn from the bath at every 2 hours and quenched. The results of measuring the diethylene glycol (DEG) content and carboxyl radical (—COOH) content in the contents of the tubes are as shown in Table 2.

TABLE 2

| Heating time (hr.) | 0 | 2 | 4 | 6 | 8 |
|---|---|---|---|---|---|
| Group A: | | | | | |
| DEG content (mol percent) | | 1.42 | 2.47 | 3.29 | 4.56 | 4.78 |
| —COOH content (eq./kg.) | | | | 0.20 | 0.18 | 0.20 |
| Group B: | | | | | |
| DEG content (mol percent) | | 6.52 | 9.04 | 12.33 | 17.37 | 19.10 |
| —COOH content (eq./kg.) | | | | 1.75 | 1.76 | 1.80 |

In the group A tubes, 7.68 eq./kg. of hydroxyl radical participated in the ether formation in the presence of 0.20 eq./kg. of carboxyl radical formed by the hydrolysis caused by the water present in bis(β-hydroxyethyl) terephthalate. Again in the group B tubes, 8.65 eq./kg. of hydroxyl radical participated in the ether formation in the presence of 1.75 eq./kg. of carboxyl radical (accordingly, with the reaction ratio of 74.6%). The rate of ether formation being proportional to the square of hydroxyl radical concentration, when proton in the reaction system does not promote etherification, the ratio of diethylene glycol formation rate between the group B and group A is assumably $(8.65/7.68)^2 = 1.27$. However, as shown in Table 2, the ratio of diethylene glycol formation rate empirically obtained was 3.50, which is 2.76 times the calculated value. This is due to the presence of a large quantity of carboxyl radical which accelerates the etherification reaction.

Control

This control is to show, in esterification of terephthalic acid with ethylene glycol, how the presence of oligomer influences the softening point of the ultimately produced polyester.

To 127 parts of bis(β-hydroxyethyl) terephthalate obtained in the reaction (A) of Example 7, 0.03 mol percent of antimony trioxide was added, and the mixture was placed in a polymerization autoclave and heated to 285° C. First ethylene glycol distilled off under atmospheric pressure was removed, and thereafter the pressure was gradually reduced to 0.2 mm. Hg for over 30 minutes. Fifty minutes later, a polymer having an intrinsic viscosity of 0.67, a softening point of 257.6° C. and a diethylene glycol content of 2.90 mol percent was obtained.

Again when an experiment was run in the manner of reaction (A) of Example 7 using 127 parts of bis(β-hydroxyethyl) terephthalate obtained in Example 7, 83 parts of terephthalic acid and 62 parts of ethylene glycol, 70 minutes after the distillation of water started, the temperature at the top of the column started to fall, and the reaction terminated within the total reaction time of 130 minutes. The reaction product was polycondensed in the similar manner as above, with 0.03 mol percent of antimony trioxide added thereto, to produce a polymer having an intrinsic viscosity of 0.66, a softening point of 258.4° C., and a diethylene glycol content of 2.57 mol percent.

We claim:

1. A process for the preparation of fiber-forming polyesters wherein the direct reaction of an acid component and a glycol is avoided, such process comprising:
   (1) as a first step,
   reacting (i) an acid component selected from the group consisting of terephthalic acid and dibasic acid mixtures containing at least 85 mole percent of terephthalic acid with (ii) an oligomer (A) comprising the reaction product of (x) an acid component of the same composition as said acid component and (y) a glycol, said oligomer (A) having an average degree of polymerization of 1 or more but less than 3 and having hydroxyl radicals at the termini, at the ratio of more than 1 mol of (ii) per mol of (i) and within the temperature range of 220–280° C. to form an oligomer (B) having an average degree of polymerization of 3–10 and having hydroxyl radicals substantially at the termini;
   (2) as a second step,
   reacting at least a portion of said oligomer (B) with a glycol of the same composition as said glycol (y), within the temperature range of 200–250° C. to depolymerize said oligomer (B) to produce an oligomer (A') having an average degree of polymerization of 1 or more but less than 3 and (3) as a third step,
preparing said fiber forming polyester by polycondensing, with heating, an oligomer selected from the group consisting of (a) any remaining portion of the oligomer (B), (b) a portion of the oligomer (A') and (c) mixtures of (a) and (b), with the provision that at least some of oligomer (B) or (A') must be polycondensed to form said fiber forming polyester, while recycling the remaining portion of said oligomer (A') to use it as the oligomer (A) of the first step.

2. The process of claim 1 wherein the reaction of step (1) is conducted at a temperature of 230–260° C.

3. The process of claim 1 wherein the reaction of step (2) is conducted at a temperature of 200–220° C.

4. Process for the preparation of polyethylene terephthalate wherein the direct reaction of terephthalic acid and ethylene glycol is avoided, such process comprising (1) as a first step,
reacting (i) terephthalic acid with (ii) bis(β-hydroxyethyl)-terephthalate or an oligomer (A) of bis(β-hydroxyethyl)-terephthalate, said oligomer having an average degree of polymerization of less than 3 and having hydroxyl radicals at the termini, in a ratio more than 1 mol of (ii) per mol of (i) at a temperature in the range of 230–260° C., to form an oligomer (B) having an average degree of polymerization of 3–10 and hydroxyl radicals substantially at the termini, (2) as a second step,
reacting at least a portion of said oligomer (B) with ethylene glycol at a temperature in the range of 200–250° C. to depolymerize the said oligomer (B), thus producing bis(β-hydroxyethyl)-terephthalate or an oligomer (A') of bis(β-hydroxyethyl)-terephthalate, said oligomer having an average degree of polymerization of less than 3 and hydroxyl radicals at the termini, and (3) as a third step,
preparing said polyethylene terephthalate by polycondensing, with heating, a material selected from the group consisting of (a) any remaining portion of said oligomer (B), (b) bis(β-hydroxyethyl)-terephthalate, (c) a portion of said oligomer (A') and (d) mixtures thereof, with the provision that at least some of (a), (b), or (c) must be polycondensed to form said polyethylene terephthalate, while recycling any remaining portion of said bis(β-hydroxyethyl)-terephthalate or the oligomer (A') to use it respectively as the bis(β-hydroxyethyl)-terephthalate or the oligomer (A) of the first step.

References Cited

UNITED STATES PATENTS

| | | |
|---|---|---|
| 2,799,664 | 7/1957 | Drewitt et al. |
| 2,855,432 | 10/1958 | Binder _____ 260—475 |
| 3,070,575 | 12/1962 | Cramer. |
| 3,174,830 | 3/1965 | Watzl. |

FOREIGN PATENTS

| | | |
|---|---|---|
| 1,368,576 | 6/1964 | France. |
| 1,065,608 | 9/1959 | Germany. |
| 676,372 | 7/1952 | Great Britain. |
| 775,030 | 9/1957 | Great Britain. |
| 1,001,787 | 8/1965 | Great Britain. |
| 292,981 | 7/1965 | Netherlands. |

WILLIAM H. SHORT, *Primary Examiner.*

LOUISE P. QUAST, *Assistant Examiner.*

U.S. Cl. X.R.

260—475